(12) United States Patent
Wu, Jr. et al.

(10) Patent No.: US 8,134,449 B2
(45) Date of Patent: Mar. 13, 2012

(54) METHOD AND SYSTEM FOR BIOMETRIC KEYBOARD

(75) Inventors: Mario T. Wu, Jr., Los Angeles, CA (US); John J. Guo, Oak Park, CA (US); Larry Rice, Simi Valley, CA (US)

(73) Assignee: Minebea Co., Ltd, Nagano-Ken (JP)

( * ) Notice: Subject to any disclaimer, the term of this patent is extended or adjusted under 35 U.S.C. 154(b) by 692 days.

(21) Appl. No.: 12/256,377

(22) Filed: Oct. 22, 2008

(65) Prior Publication Data

US 2009/0134972 A1    May 28, 2009

Related U.S. Application Data

(60) Provisional application No. 60/982,101, filed on Oct. 23, 2007.

(51) Int. Cl.
*G05B 19/00* (2006.01)
(52) U.S. Cl. ....... 340/5.85; 340/5.54; 713/186; 707/603
(58) Field of Classification Search .................... 340/5.8, 340/5.81, 5.82, 5.83, 5.85; 455/41.2; 713/186, 713/168, 200; 707/603, 703
See application file for complete search history.

(56) References Cited

U.S. PATENT DOCUMENTS

| 4,805,222 | A | * | 2/1989 | Young et al. | 382/115 |
|---|---|---|---|---|---|
| 5,455,570 | A | * | 10/1995 | Cook et al. | 340/3.71 |
| 5,557,686 | A | * | 9/1996 | Brown et al. | 382/115 |
| 6,442,692 | B1 | * | 8/2002 | Zilberman | 713/184 |
| 2006/0105712 | A1 | * | 5/2006 | Glass et al. | 455/41.2 |
| 2006/0176281 | A1 | * | 8/2006 | Bennett et al. | 345/169 |
| 2007/0222757 | A1 | * | 9/2007 | Tsai | 345/168 |

* cited by examiner

*Primary Examiner* — Nabil Syed
(74) *Attorney, Agent, or Firm* — George B..F. Yee; Fountainhead Law Group PC (57) ABSTRACT

A method for training a computing system using keyboard biometric information. The method includes depressing two or more keys on a keyboard input device for a first sequence of keys. The method then determines a key press time for each of the two or more keys to provide a key press time characteristic in the first sequence of keys. The method also determines a flight time between a first key and a second key to provide a flight time characteristic in the first sequence of keys, the first key being within the two or more keys. The method includes storing the key press time characteristic and the flight time characteristic for the first sequence of keys, and displaying indications associated with the first sequence of keys on a display device provided on a portion of the keyboard input device.

8 Claims, 7 Drawing Sheets

METHOD AND SYSTEM FOR BIOMETRIC KEYBOARD

CROSS-REFERENCES TO RELATED APPLICATIONS

This application claims priority to U.S. Provisional Patent Application No. 60/982,101, filed Oct. 23, 2007, entitled "METHOD AND SYSTEM FOR BIOMETRIC KEYBOARD" by inventor MARIO T. WU, JR. et al. commonly assigned and incorporated by reference herein for all purposes.

BACKGROUND OF THE INVENTION

The present invention is directed to computer hardware and software. In particular, the invention provides a method and system for security management of computing input devices. More particularly, the invention provides a method and system for providing security to computing input devices associated with user typing behavior biometrics. Merely by way of example, the computing input devices include keyboards, but it would be recognized that the invention has a much broader range of applicability. For example, the invention can be applied to other computing and/or electronic devices.

Computing technologies proliferated over the years. In the early days, large mainframe computers dominated the computing landscape. These large mainframe computers were developed by companies such as IBM Corporation of Armonk, N.Y. Mainframe computers have been replaced, at least in part, by smaller computing devices, commonly known as "PCs." PCs come in various shapes and sizes. PCs are often run using computer software such as Windows from Microsoft Corporation from Redmond Wash. Other types of computer software come from Apple Computer of Cupertino, Calif. Smaller PC versions are often called "lap top computers." Other types of PCs include larger desktop versions. Still other versions of PCs can be found in smaller devices such as personal digital assistants, called PDAs, cellular phones, and a variety of other applications.

All of these computing devices generally require identity verification of users. As merely an example, computer keyboards are most commonly used as such input devices, and user ID and password are often used to verify a user's identity. Unfortunately, certain limitations exist in such verification. For example, user ID and password can be stolen. In other cases, trial-and-error methods, either manual or automated, can be used to derive user ID and password. Accordingly, biometrics information based on user typing behavior has been proposed for user identification.

Although biometrics behavior information has been used with certain computer applications, various limitations still exist. For example, integration of keyboard dynamics biometrics information can also cause complications in computer systems software. In addition, once a user is logged in, the computing system can be left unattended and can become vulnerable to misuse. These and other limitations have been described throughout the present specification and more particularly below.

From the above, it is seen that an improved technique for computer operation using keyboard biometrics information is desired.

BRIEF SUMMARY OF THE INVENTION

According to the present invention, techniques directed to computer hardware and software are provided. In particular, the invention provides a method and system for secure operation of computing systems. More particularly, the invention provides a method and system for providing security to computing systems associated with authenticating and continuous verification of user identify using keyboard typing behavior biometrics. Merely by way of example, the computing input devices include biometric keyboards, but it would be recognized that the invention has a much broader range of applicability. For example, the invention can be applied to other computing devices such as personal computers, personal digital assistants, cell phones, desktop and notebook computers, computer peripherals, such as keyboard, mice, game controllers, TV/Entertainment systems, any combination of these, and the like. Depending upon the embodiment, the invention can be applied to access control and/or security for any of the above devices, among others.

In a specific embodiment, the present invention provides a method for training a computing system using keyboard biometric information. The method includes a user depressing two or more keys on a keyboard input device for a first sequence of keys, and determining a key press time for each of the two or more keys to provide a key press time characteristic in the first sequence of keys. The method includes determining a flight time between a first key and a second key to provide a flight time characteristic in the first sequence of keys. In an embodiment, the first key is within the two or more keys. The method also includes storing in a database the key press time characteristic and the flight time characteristic for the first sequence of keys, and displaying indications associated with the first sequence of keys on a display device provided on a portion of the keyboard input device. In a preferred embodiment, the method includes determining a keyboard identifier using a computing system coupled to the keyboard input device, and processing the keyboard identifier to determine if the keyboard is compatible with the computing system. Depending upon the embodiment, the method can include prompting the user to set a first error margin for the key press time characteristic and a second error margin for the flight time characteristic for the first sequence of keys, and storing the error margins in a biometrics database. In a specific embodiment, the display device is a liquid crystal display (LCD) device. In another embodiment, the display device can be a matrix display device. In an embodiment, the display device is capable of displaying at least 32 characters. In an embodiment, the first sequence of keys is associated with a password. In a specific embodiment, keyboard input device includes a wireless device which allows the keyboard input device to interface with the computing system. In a preferred embodiment, the keyboard input device is stand alone having an independent power source. The independent power source includes a battery, and the computer input device is free of an AC adapter. In another embodiment, the keyboard input device is stand alone having an independent power source, and the independent power source includes two AA batteries.

In an alternative specific embodiment, the present invention provides a keyboard input device. The keyboard input device includes a housing and a processing unit within the housing. The keyboard input device includes a plurality of input keys coupled to the processing unit and a display device also coupled to the processing unit. The keyboard input device also includes one or more computer memories coupled to the processing unit. Various computer codes are provided within the one or more memories. One or more codes is directed to determining a key press time for each of a first sequence of keys pressed by a user to provide a key press time characteristic for each of the first sequence of keys. One or more codes is directed to determining a key flight time for each pair of consecutive keys in the first sequence of keys to provide a key flight time characteristic for the first sequence of keys. One or more codes is directed to displaying on the display device indications associated with the key press time characteristic and the key flight time characteristic of the first sequence of keys. Depending upon the embodiment, various additional codes can be provided in the one or more computer memories. One or more codes is directed to providing a keyboard identifier to a computing system. One or more codes is directed to providing to the computing system information derived from the key press time characteristic and the key flight time characteristic of the first sequence of keys. One or more codes is directed to displaying on the display device indications whether the keyboard identifier is compatible with the computing system. In a specific embodiment, the one or more computer memories includes one or more codes directed to prompting the user to set a first error margin for the key press time characteristic and a second error margin for the flight time characteristic for the first sequence of keys and one or more codes directed to storing the first and second error margins in a database.

In a specific embodiment, keyboard input device includes a wireless device which allows the keyboard input device to interface with the computing system. Depending upon the embodiments, the display device can be a liquid crystal display (LCD) device. In another embodiment the display device can be a matrix display device. In an embodiment, the display device is capable of displaying at least 32 characters. In an embodiment, the first sequence of keys is associated with a password. In a preferred embodiment, the keyboard input device is stand alone having an independent power source. The independent power source includes a battery, and the computer input device is free of an AC adapter. In another embodiment, the keyboard input device is stand alone having an independent power source, and the independent power source includes at least two AA batteries.

In yet an alternative embodiment, the present invention provides a method for secure operation of a computing system using a biometrics keyboard. The method includes providing a database of user keyboard behavior biometrics information and authenticating a user to use the biometrics keyboard. The method establishes secure connection with the computing system. The method also includes probing the computing system to determine if a connection with the computing system is compromised. There are many ways in which a connection to a computing system can be compromised. For example, the physical or electrical connection to the computing system can be deteriorated to prevent reliable communication. In another example, the identity or the behavior of the host computing system may become questionable. If the connection is compromised, the method disables the connection with the computing system. In a preferred embodiment, the method continuously samples user keyboard behavior biometric information to determine if it is within an allowable tolerance. In an embodiment, the method disables the connection with the computing system, if the sampled user keyboard behavior biometric information exceeds the allowable tolerance.

Depending on embodiments, the method authenticates a user to use the biometrics keyboard first by prompting the user to enter a user ID and a user password. The method then derives biometric behavioral information from the entered user ID and user password. The method compares the derived biometric behavioral information with the database to determine if the derived biometric behavioral information is within an allowable tolerance. The method disables the connection with the computing system, if the derived biometric behavioral information exceeds the allowable tolerance. In an embodiment, the method tightens the tolerance, if the derived biometric behavioral information is within the allowable tolerance. Depending on the embodiments, to disable a connection to the computing system, the method disconnects the keyboard from the computing system and displays indications associated with the disconnection on a display device provided on a portion of the keyboard input device. In a specific embodiment, the method incorporates the sampled user keyboard behavior biometric information to improve database accuracy.

In a specific embodiment, keyboard input device includes a wireless device which allows the keyboard input device to interface with the computing system. Depending upon the embodiments, the display device can be a liquid crystal display (LCD) device. In another embodiment the display device can be a matrix display device. In an embodiment, the display device is capable of displaying at least 32 characters. In an embodiment, the first sequence of keys is associated with a password. In a preferred embodiment, the keyboard input device is stand alone having an independent power source. The independent power source includes a battery, and the computer input device is free of an AC adapter. In another embodiment, the keyboard input device is stand alone having an independent power source, and the independent power source includes at least two AA batteries.

Numerous benefits are achieved using one or more features of the present invention. In a specific embodiment, the present invention can provide a method and system for improved security for computing systems. The present invention also provides a method and system for using conventional computer hardware and software technologies. Additionally, in a specific embodiment, the invention can provide for a standalone biometric keyboard which can authenticate a user independent of a computing system. In a preferred embodiment, the present the keyboard can include a display which helps a user to train the keyboard of the user's typing biometric behavior dynamics. In certain embodiments, the present method and system can provide continuous verification of a user after the user has been authenticated. In other embodiments, the present method and system can be applied to access/control and security for cell phones, digital cameras, home or office lighting control, door entry control, personal digital assistants, desktop and notebook computers, computer peripherals (e.g., keyboard, mice, game controllers), TV/entertainment systems, combinations of these, among others. Depending upon the specific embodiment, the invention also provides a security method using keyboard behavior biometrics capabilities that are implemented using conventional computer software and hardware. Depending upon the embodiment, one or more of these benefits may be achieved. These and other benefits are described throughout the present specification and more particularly below.

The present invention achieves these benefits and others in the context of known process technology. However, a further understanding of the nature and advantages of the present invention may be realized by reference to the latter portions of the specification and attached drawings.

DETAILED DESCRIPTION OF THE INVENTION

According to the present invention, techniques directed to computer hardware and software are provided. In particular, the invention provides a method and system for secure operation of computing systems. More particularly, the invention provides a method and system for providing security to computing systems associated with authenticating and continuous verification of user identify using user typing behavior biometrics. Merely by way of example, the computing input devices include biometric keyboards, but it would be recognized that the invention has a much broader range of applicability. For example, the invention can be applied to other computing devices such as personal computers, personal digital assistants, cell phones, desktop and notebook computers, computer peripherals, such as keyboard, mice, game controllers, TV/Entertainment systems, any combination of these, and the like. Depending upon the embodiment, the invention can be applied to access control and/or security for any of the above devices, among others.

Figure 1:
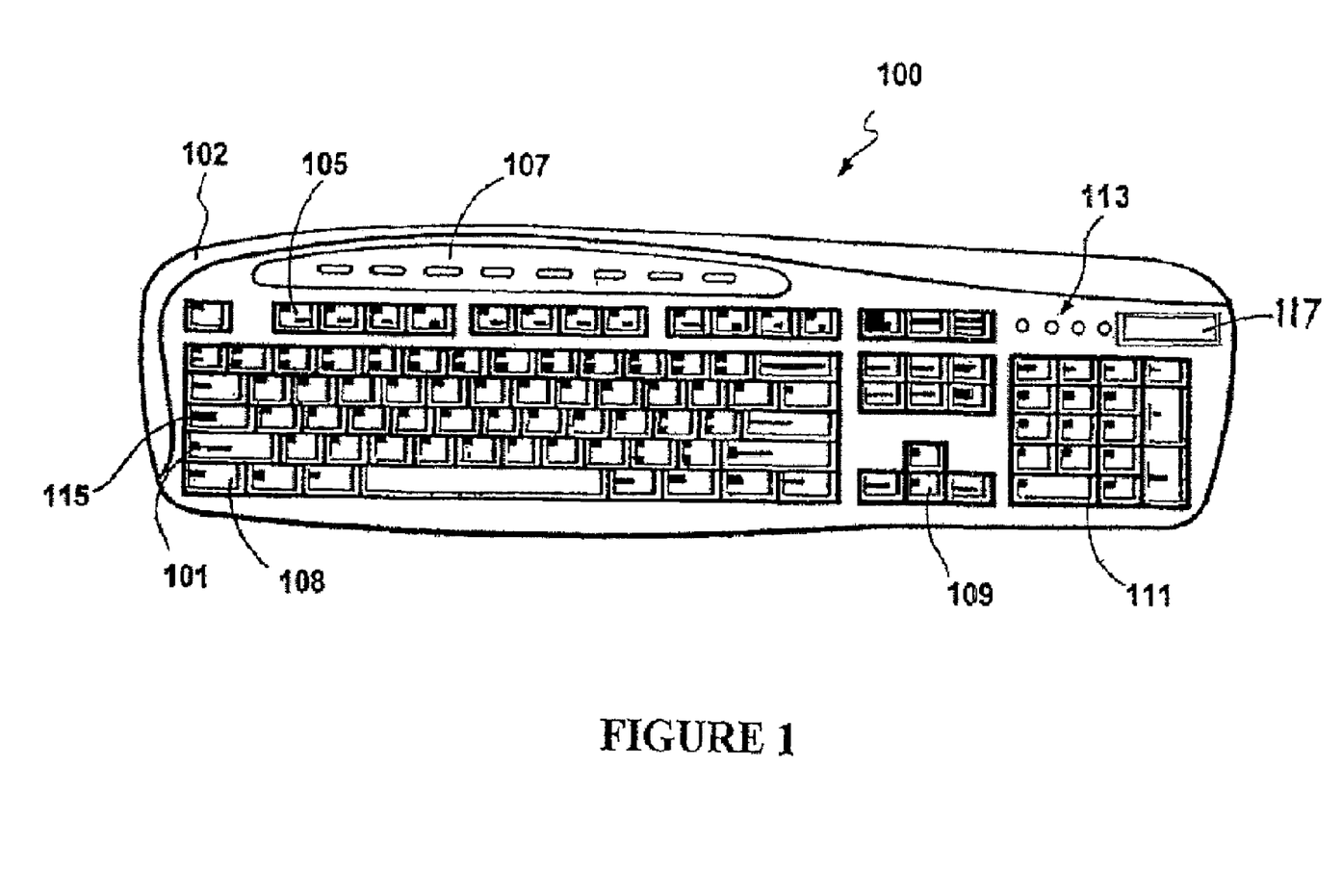
FIG. 1 is a simplified diagram of a keyboard device according to an embodiment of the present invention.

FIG. 1 is a simplified diagram of a keyboard device 100 according to an embodiment of the present invention. This diagram is merely an example, which should not unduly limit the scope of the claims herein. One of ordinary skill in the art would recognize other variations, modifications, and alternatives. As shown, the keyboard device 100 includes housing member 102. In specific embodiment, the housing member is often made of a suitable plastic material and/or metal that has support and can protect the internal devices in the keyboard. The housing includes a plurality of conventional keys 101. The conventional keys include alphanumeric keys, e.g., letters and numbers. The keyboard also has punctuation keys, e.g., comma, period, semicolon, question mark.

As also shown, the keyboard has special keys 105, 109, 111. As shown, the special function keys include function keys 107, control keys 108, arrow keys 109, Caps Lock key 115, and a numerical pad 111, among others. In a specific embodiment, the standard layout is commonly known as a "QWERTY" keyboard because the first six keys on the top row of letters spell QWERTY. Other types of keyboard designs include the Dvorak keyboard. Other types of keys can be Page Up, Page Down, Home, End, Insert, Pause, Num Lock, Scroll Lock, Break, Caps Lock, Print Screen as featured in an IBM style keyboard design.

In an embodiment, the keyboard also has certain power consuming elements and/or devices 113. These power consuming elements include light emitting diodes, commonly termed LEDs. The elements also include specialized input devices such as those for Smart Cards, PCMCIA type, one or more liquid crystal displays, back lighting for display devices, backlight of key caps, e.g., blue, red, white, green, and amber LEDs coupled to each key, any combination of these, and the like. Of course, there can be other variations, modifications, and alternatives.

In a preferred embodiment, the keyboard also includes a display device 117. Depending upon the embodiments, the display device 117 can be a matrix or a color LCD display, or other kinds of display device. In an embodiment, display device is capable of displaying at least 32 characters, which is the maximum number of characters for a valid password in some computing systems. In some embodiments, the display device can be capable of displaying fewer than 32 characters. In a preferred embodiment, the display device 117 can be used by a user for "training" the keyboard on his/her behavior biometric. Depending upon the embodiments, the behavior biometric of keystroke dynamics can include the length of time when a particular key is pressed and a key flight time which is the time between two consecutive user key strokes. Of course, there can be other variations, modifications, and alternatives.

In a specific embodiment, the keyboard can have wireless devices. These wireless devices allow the keyboard and its functionality to interface with personal computers, laptop computers, television sets, and other computing based units. To provide power for these wireless devices, the keyboard has an independent battery power source. In a specific embodiment, the power source can be two or more AA batteries and/or other like type of power sources. In a preferred embodiment, the keyboard also has a wireless power savings process. Of course, there can be other variations, modifications, and alternatives. Further details of the keyboard can be found throughout the present specification and more particularly below.

Figure 2:
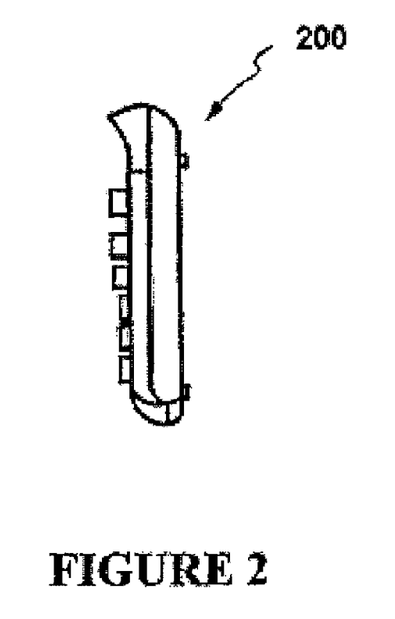
FIG. 2 is a simplified side-view diagram of a keyboard device according to an embodiment of the present invention.

FIG. 2 is a simplified side-view diagram 200 of a keyboard device according to an embodiment of the present invention. This diagram is merely an example, which should not unduly limit the scope of the claims herein. One of ordinary skill in the art would recognize other variations, modifications, and alternatives.

Figure 3:
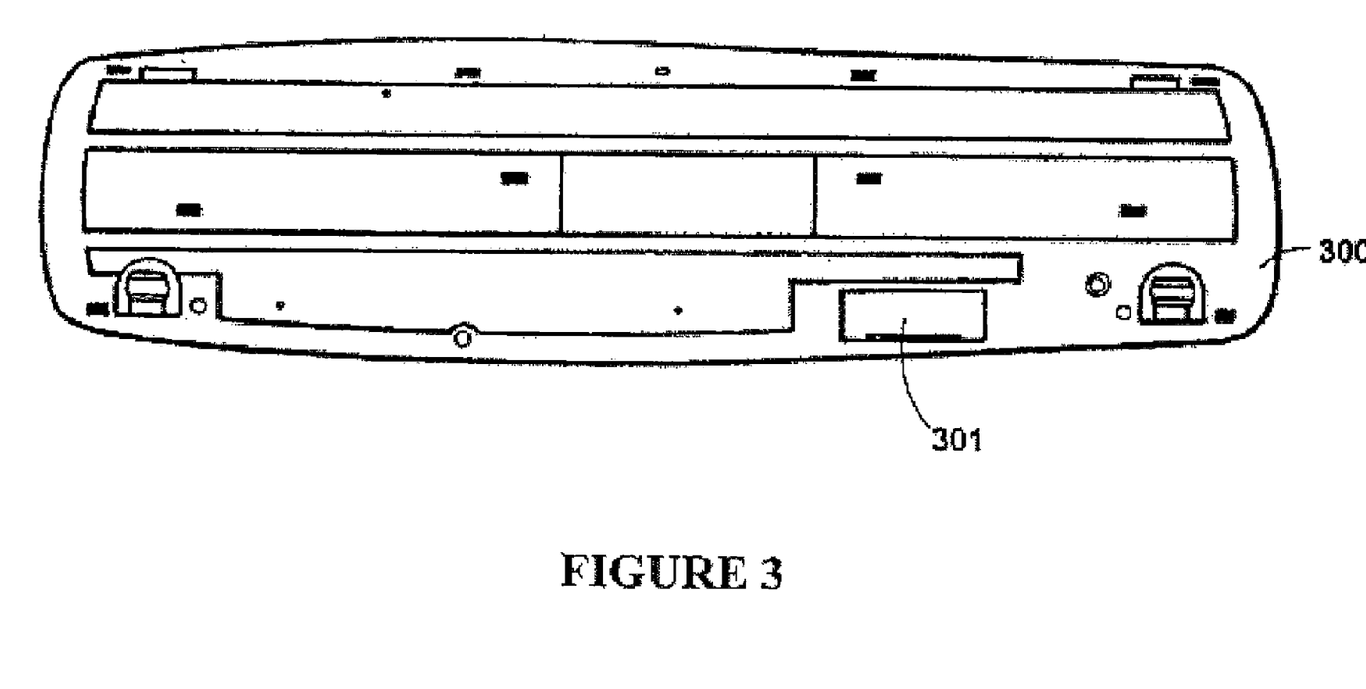
FIG. 3 is a simplified back-side diagram of a keyboard device according to an embodiment of the present invention.

FIG. 3 is a simplified back-side diagram 300 of a keyboard device according to an embodiment of the present invention. This diagram is merely an example, which should not unduly limit the scope of the claims herein. One of ordinary skill in the art would recognize other variations, modifications, and alternatives. As shown, the backside includes an area for inserting a battery 301, which may be a single and/or multiple power sources according to a specific embodiment. Details of specific functional elements within the keyboard are provided throughout the present specification and more particularly below.

Figure 4:
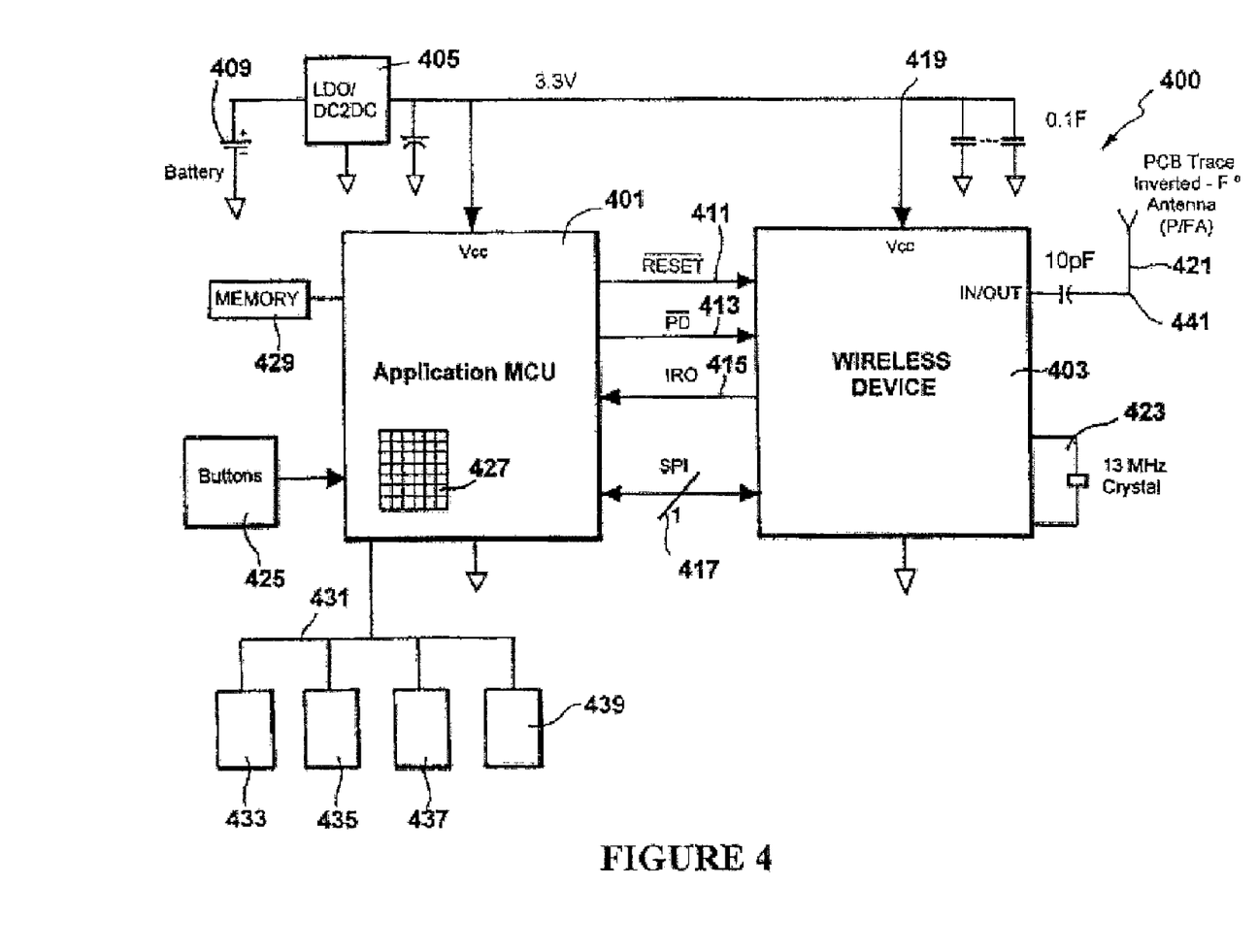
FIG. 4 is a simplified block diagram of a keyboard system according to an embodiment of the present invention.

FIG. 4 is a simplified block diagram of a keyboard system 400 according to an embodiment of the present invention. This diagram is merely an example, which should not unduly limit the scope of the claims herein. One of ordinary skill in the art would recognize other variations, modifications, and alternatives. As shown, the system 400 includes various elements. These elements include a micro controller unit 401, commonly termed MCU, coupled to a wireless unit 403. The MCU is general purpose and suitable for use in the keyboard. The MCU often has a clock speed of 1 Mega Hertz and greater and also has memory 427, which may be embedded and/or external (429) memory, to the MCU according to a specific embodiment. As merely an example, the MCU can be an Encore Series from Cypress Semiconductor Corporation of California, but can be others. Other types of MCU can be from Zilog Corporation, Intel Corporation, and other companies. Of course, there can be other variations, modifications, and alternatives.

In a specific embodiment, the memory can be any suitable memory for holding various computer codes and databases for operating at least the present methods. These memories can be volatile, such as dynamic random access memory, static random access memory, and/or Flash memory, e.g., NAND Flash. Preferably, the memory does not require a high amount of power consumption. Of course, there can be various alternatives, modifications, and variations.

As shown, the MCU couples to each of the keyboard buttons 425. The MCU often generates one or more keyboard output signals corresponding to respective one or more depression (or movements) from each key on the keyboard. In an embodiment, the MCU transmits via SPI interface 417 the output signals to the wireless device. In alternative embodiments, other interfaces can be used, for example, RS232, parallel I/O and I2C, among others. The wireless device outputs corresponding wireless telecommunication signals via antenna 421. Other interfaces between the wireless device and MCU include a RESET 411, IPD (Power Down) 413, IRQ (Interrupt) 415, and there also may be other elements, depending upon the specific embodiment.

In a specific embodiment, the wireless unit 403 transmits/receives wireless signals. As noted keyboard signals converted by the MCU are transmitted via the wireless device and antenna to the computing device, such as PCs, laptop computers, work stations, and other applications. The wireless unit also includes power Vcc 419 from a power source 409. The wireless unit is also coupled to an oscillator and/or crystal 423, which provides a 13 Mega Hertz signal in a specific embodiment.

In a preferred embodiment, the wireless unit also includes a receive antenna 441, which may be the same as the transmit antenna. In a preferred embodiment, the receive antenna "sniffs" the spatial region for one or more packets from a tag device. Depending upon the embodiment, the wireless unit can use one or more wireless formats such as Blue Tooth format, IEEE 802.11 Series, and others. Depending upon the specific embodiment, the wireless unit can also be characterized by a carrier frequency of 2.4 GHz and greater, 13.0 Mega Hertz and greater, and others. The wireless unit can use various technologies such as RF sensing, infra-red sensing, and others. Of course, one of ordinary skill in the art would recognize various alternatives, modifications, and variations.

As also noted, the system has power source 409, which supplies power to the MCU, wireless unit, and other elements. That is, in an embodiment, the power source is for supplying a direct current to the MCU and the wireless unit. The power source is generally formed at a suitable position in a bottom portion of the housing of the keyboard housing in such a way that it can be removed from the back of the bottom housing. As merely an example, the power source can be a carbon based battery or lithium based batteries, depending upon the embodiment. In a specific embodiment using the power source, the computer keyboard is stand alone and is free of an AC adapter. In alternative embodiments, the keyboard can use power from the PC, for example, in wired USB and PS2 keyboards. The power source is coupled to a voltage regulator 415, which couples to ground and has a capacitor coupled between the voltage regulator output and MCU and wireless unit according to a specific embodiment. Of course, there can be other variations, modifications, and alternatives.

In a preferred embodiment, the system also includes various power consuming devices 433, 435, 437, 439, among others. These elements receive signals from the MCU and are powered by the power source 409. The elements include a display (e.g., LCD, CMOS) 433, smart card reader 435, light emitting diodes 437, and others 439. In a specific embodiment, one or more power consuming elements uses about 50 milli-Amps having a voltage at about 3.3 volts and less. In an alternative specific embodiment, one or more power consuming elements uses about 50 milli-Amps at a voltage of about 3.3 volts and less. In a preferred embodiment, the keyboard including the one or more power consuming devices is operable at normal consumption for six months or more with a conventional power source, e.g., two AA batteries.

In a preferred embodiment, display device 433 can be a matrix or a color LCD display, or other kinds of display device. In an embodiment, display device is capable of displaying at least 32 characters, which is the maximum number of characters for a valid password in some computing systems. In a preferred embodiment, the display device 433 can be used by a user for "training" the keyboard on his/her behavior biometric. Depending upon the embodiments, the behavior biometric of keystroke dynamics can include the length of time when a particular key is pressed and a key flight time, which is the time between two consecutive user key strokes. In an embodiment, the key press time can be determined by a software code. Alternatively, the key press time can be tracked by a hardware counter. Depending upon the specific embodiment, the key flight time can be determined by a software code. Alternatively, the key flight time can be tracked by a hardware counter. Of course, there can be other variations, modifications, and alternatives.

A method for training a computing system using keyboard biometric information according to an embodiment of the present invention can be briefly outlined below.

1. depressing two or more keys on a keyboard input device for a first sequence of keys;
2. determining a key press time for each of the two or more keys to provide a key press time characteristic in the first sequence of keys;
3. determining a flight time between a first key and a second key to provide a flight time characteristic in the first sequence of keys, the first key being within the two or more keys;
4. storing the key press time characteristic and the flight time characteristic for the first sequence of keys;
5. displaying indications associated with the first sequence of keys on a display device provided on a portion of the keyboard input device; and
6. determining a keyboard identifier using a computing system coupled to the keyboard input device, and processing the keyboard identifier to determine if the keyboard identifier is compatible with the computing system.

The above sequence of steps provides a method for training a computing system using keyboard biometric information according to an embodiment of the present invention. As shown, the method uses a combination of steps including a way of determining and storing a key press time characteristic and a flight time characteristic for a sequence of keys and displaying indications associated with the sequence of keys on a display device. Other alternatives can also be provided where steps are added, one or more steps are removed, or one or more steps are provided in a different sequence without departing from the scope of the claims herein. Further details of the present method can be found throughout the present specification and more particularly below.

Figure 5:
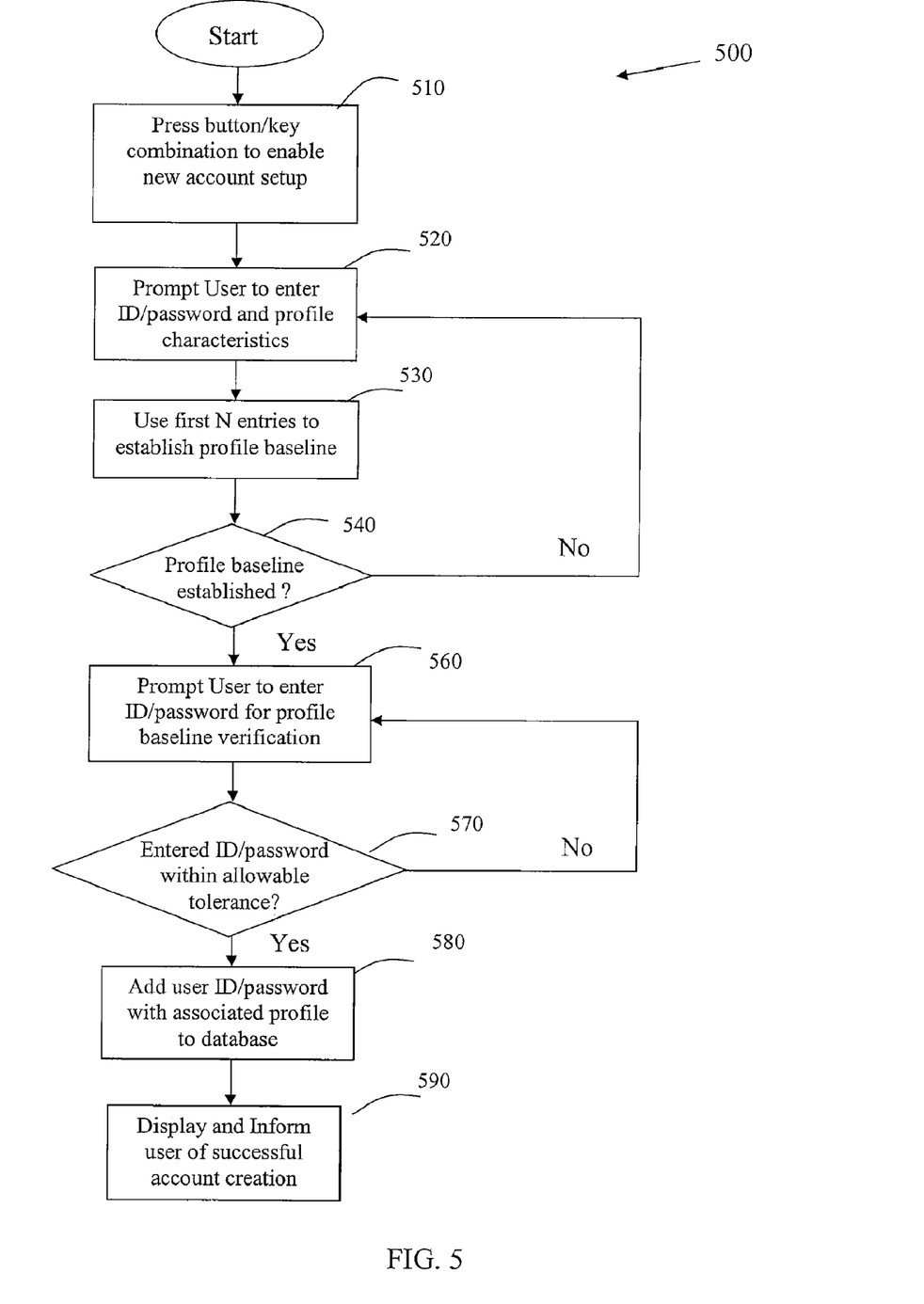
FIG. 5 is a simplified flow diagram of a method for training a computer system using keyboard biometric information according to an embodiment of the present invention.

FIG. 5 is a simplified flow diagram 500 of a method for training a computing system using keyboard biometric information according to an embodiment of the present invention. This diagram is merely an example, which should not unduly limit the scope of the claims herein. One of ordinary skill in the art would recognize other variations, modifications, and alternatives. As shown, the method includes a user pressing a button or key combination (step 510) to enable new account setup to start training, and the keyboard input device prompting the user (step 520) to enter information such as ID and password, and the user depressing two or more keys on a keyboard input device for a first sequence of keys. In a preferred embodiment, the first sequence of key strokes are a sample of a user's typing behavior used for training the keyboard device. As an example, the first sequence of keys can be a password according to a specific embodiment.

In a specific embodiment, the method determines user profile (step 530) from user input. The user profile includes at least a key press time for each of the keys to provide a key press time characteristic in the first sequence of keys. Depending upon the specific embodiment, the key press time measures an interval between a time a key is press down and a time the key is released. In an embodiment, the key press time can be determined by a software code. Alternatively, the key press time can be tracked by a hardware counter. In a specific embodiment, the method determines (step 530) a flight time between a first key and a second key to provide a flight time characteristic in the first sequence of keys. In a specific embodiment, the flight time measures the elapsed time between two consecutive keystrokes entered by the user. Depending upon the specific embodiment, the key flight time can be determined by a software code. Alternatively, the key flight time can be tracked by a hardware counter. Of course, there can be other variations, modifications, and alternatives.

In a specific embodiment, the method can prompt the user to set a first error margin for the key press time characteristic and a second error margin for the flight time characteristic for the first sequence of keys. Depending upon the embodiment, the method can branch at step 540 to repeat steps 520 and 530 to establish a user profile baseline including at least a key press time characteristic and a flight time characteristic. Of course, there can be other variations, modifications, and alternatives.

Depending upon the embodiment, the method can verify user profile baseline by (step 560) prompting the user to enter ID and password information, and verify (step 570) that the entered information is within an allowed tolerance. Of course, there can be other variations, modifications, and alternatives.

Once the key press time characteristic and the flight time have been determined, the method stores (step 580) the key press time characteristic and the flight time characteristic for the first sequence of keys in a biometrics database. Depending on the embodiments, the method can store error margins or tolerance levels associated with the key press time characteristic and the flight time characteristic. In a specific embodiment, the method displays (step 590) indications associated with the first sequence of keys and informs the user of successful account creation on a display device provided on a portion of the keyboard input device. In an embodiment, the information associated with the first sequence of keys is stored in a biometric database of user typing behavior. Depending upon the embodiment, the method can repeat at least the above process to press a second sequence of keys and to determine a key press time characteristic and a flight time characteristic for the second sequence of keys. The associated information can be entered in the biometric database. Of course, there can be other variations, modifications, and alternatives.

In a specific embodiment, the method includes determining (not shown in FIG. 5) a keyboard identifier using a computing system coupled to the keyboard input device. The computing system then processes the keyboard identifier to determine if the keyboard identifier is compatible with the computing system. That is, the method provides a binding process to link a computer and a keyboard to ensure that the keyboard used has been authenticated. Of course, there can be other variations, modifications, and alternatives.

The above sequence of steps provides a method for training a computing system using keyboard biometric information according to an embodiment of the present invention. As shown, the method uses a combination of steps including a way of determining and storing a key press time characteristic and a flight time characteristic for a sequence of keys and displaying indications associated with the sequence of keys on a display device. Other alternatives can also be provided where steps are added, one or more steps are removed, or one or more steps are provided in a different sequence without departing from the scope of the claims herein. Additionally, although the above has been described in terms of a keyboard device, other devices can also be used. Further details of these other devices using the present method can be found throughout the present specification and more particularly below.

A method for secure operation of a computing system using a biometrics keyboard according to an embodiment of the present invention can be briefly outlined below:

1. providing a database of user keyboard behavior biometric information;
2. authenticating a user to use the biometrics keyboard;
3. establishing secure connection with a computer system;
4. probing the PC to determine if a connection with the PC is compromised;
5. if the connection is compromised, disabling the connection with the PC;
6. sampling user keyboard behavior biometric information;
7. determining if the sampled user keyboard behavior biometric information is within an allowable tolerance;
8. disabling the connection with the PC, if the sampled user keyboard behavior biometric information exceeds the allowable tolerance; and
9. Perform other steps, as desired.

The above sequence of steps provides a method for secure operation of a computer system using a biometrics keyboard according to an embodiment of the present invention. As shown, the method uses a combination of steps including a way of providing a database of user keyboard behavior biometric information, authenticating a user, and continuous verification of user identify using keyboard biometric information. Other alternatives can also be provided where steps are added, one or more steps are removed, or one or more steps are provided in a different sequence without departing from the scope of the claims herein. Further details of the present method can be found throughout the present specification and more particularly below.

For example, the method includes providing a database of user keyboard behavior biometrics information. In a preferred embodiment, the database of keyboard biometrics information includes at least key press time characteristic and flight time characteristic associated with a sequence of key strokes entered by a users. Depending on the embodiments, the database can include margin or tolerance information associated with acceptable user input, such as key press time characteristic and flight time characteristic. The database can include user ID and password according to a specific embodiment. Of course, there can be other variations, modifications, and alternatives.

Figure 6:
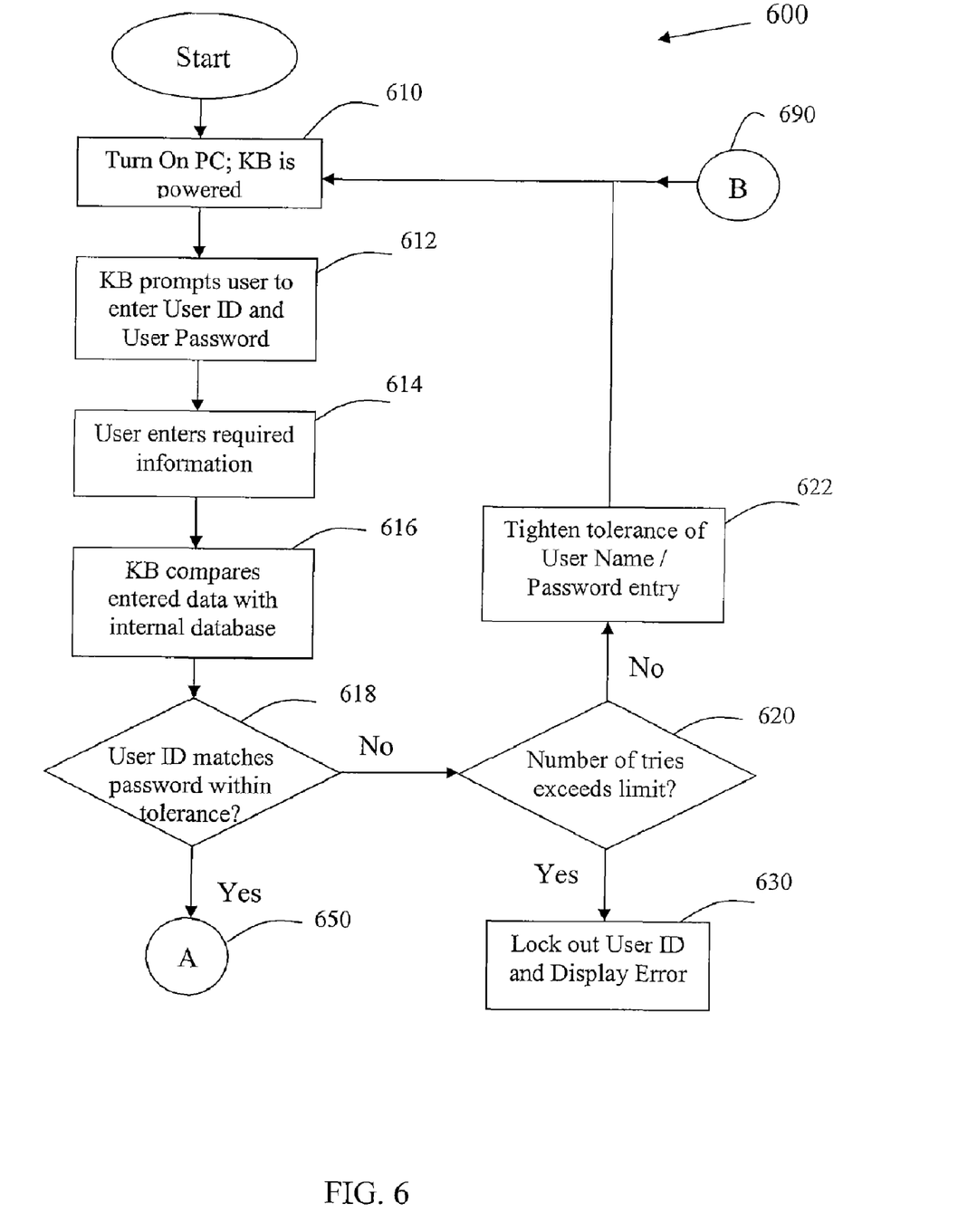
FIG. 6 is a simplified flow diagram of a method for authenticating a user for a computer system according to an embodiment of the present invention.

FIG. 6 is a simplified flow diagram 600 of a method for authenticating a user for a computing system according to an embodiment of the present invention. This diagram is merely an example, which should not unduly limit the scope of the claims herein. One of ordinary skill in the art would recognize other variations, modifications, and alternatives. As shown, the method is for authenticating a user to use a biometrics keyboard. Depending upon the specific embodiment, the method turns on the computing system and powers the keyboard (step 610) and prompts the user to enter a user ID and a user password (step 612). After the user enters the prompted information (step 614), the method derives biometric behavioral information from the entered user ID and user password. In a specific embodiment, the method (step 616) compares the derived biometric behavioral information with the database to determine if the derived biometric behavioral information is within an allowable tolerance. If the derived biometric behavioral information exceeds the allowable tolerance, the method tightens a tolerance associated with the user ID and password and allows the user to retry (step 690). If the user fails for a predetermined number of attempts (step 620), the method locks out the user ID and displays indications associated with the disconnection on a display device provided on a portion of the keyboard input device (step 630). If the derived biometric behavioral information is within the allowable tolerance (step 618), the method authorizes the user to use the keyboard (step 650) and tightens the tolerance to improve the database of biometric information according to an embodiment of the invention. Of course, there can be other variations, modifications, and alternatives.

Figure 7:
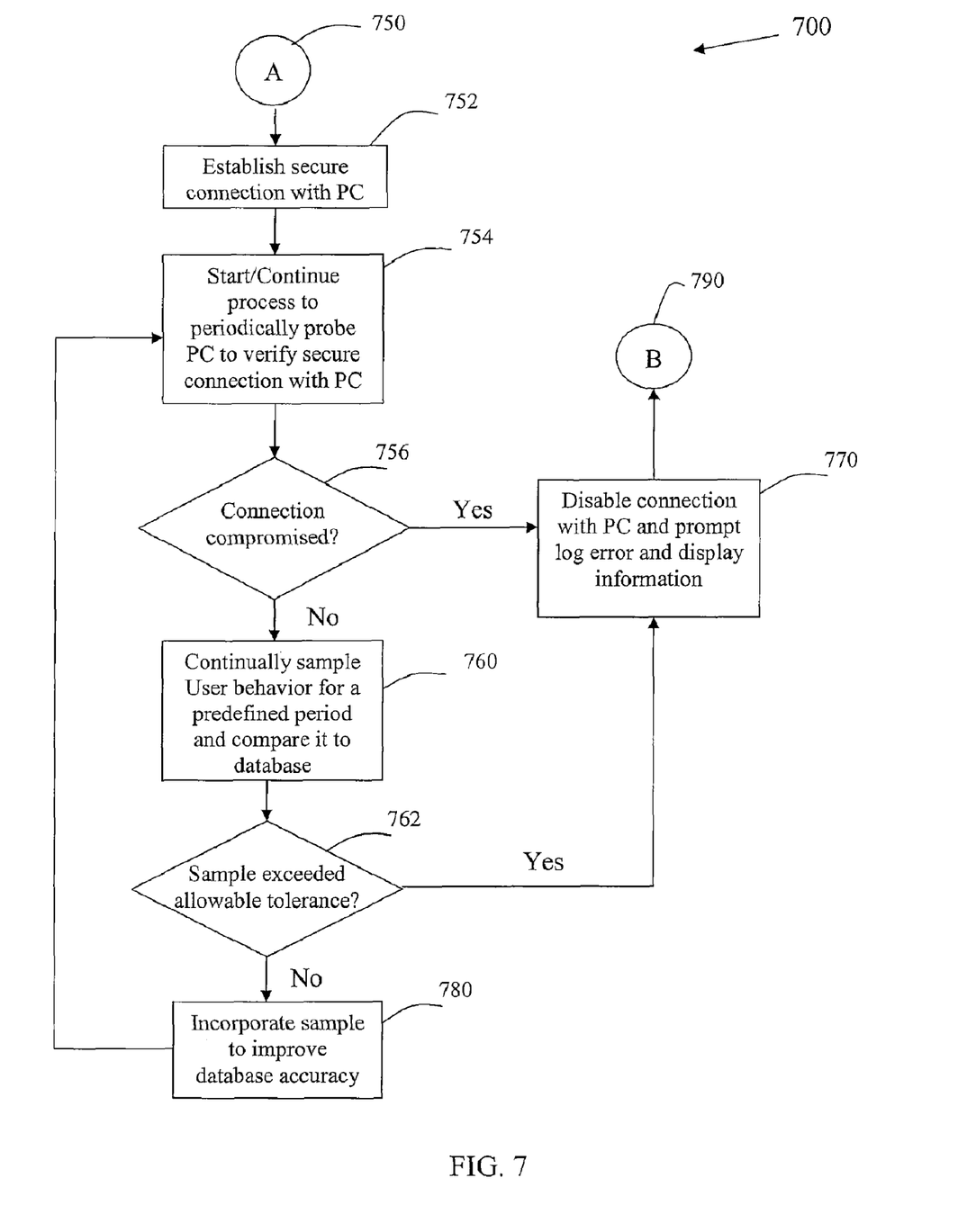
FIG. 7 is a simplified flow diagram of a method for secure operation of a computer system according to an embodiment of the present invention.

FIG. 7 is a simplified flow diagram 700 of a method for secure operation of a computer system according to an embodiment of the present invention. This diagram is merely an example, which should not unduly limit the scope of the claims herein. One of ordinary skill in the art would recognize other variations, modifications, and alternatives. As shown, the method is for secure operation of a computer system using a biometrics keyboard. The method starts (step 750 in FIG. 7) after a user has been authenticated as described above with reference to flow diagram 600 in FIG. 6 (step 650). As shown, the method (step 752) establishes a secure connection with a computer system for the authorized user. The method then (step 754) periodically probes the computer system to determine if a connection with the computer system is compromised. There are many ways in which a connection to a computing system can be compromised. For example, the physical or electrical connection to the computing system can be deteriorated to prevent reliable communication. In another example, the identity or the behavior of the host computing system may become questionable. In a specific embodiment, if (step 756) the connection is compromised, the method (step 770) disables the connection with the computer system and displays indications associated with the disconnection on a display device. At this point, the method returns (B, step 790) to start the authentication process (B, step 690 in FIG. 6). Of course, there can be other variations, modifications, and alternatives.

In a specific embodiment, the method includes (step 760) continuously sampling user keyboard behavior biometric information to ensure that the authorized user is using the keyboard. In a specific embodiment, the method samples user keyboard behavior for a predefined period to gather biometric information. Depending on the embodiments, the predefined time period can be chosen based on the user's typing speed to balance the number of scans and security. Fewer scans can save power, but frequent scans are often necessary to maintain system security. In a specific embodiment, the predefined period can be 10-20 seconds. In a specific embodiment, the method determines if the sampled user keyboard behavior biometric information is within an allowable tolerance of a biometric database. If the sampled user keyboard behavior biometric information exceeds the allowable tolerance (step 762), the method disables the connection with the computing system (770). Otherwise, the method continues (step 754) to periodically sample user keyboard biometric information, according to a specific embodiment of the invention.

In a specific embodiment, the method also incorporates (step 780) the sampled user keyboard behavior biometric information to improve database accuracy. For example, in a specific embodiment, an average of sampled biometric data is used. By incorporating the new input to the current averages stored in database, the new average can reflect more accurately the user's correct profile. In an embodiment, disabling the connection to the PC (step 770) includes disconnecting the keyboard from the PC and displaying indications associated with the disconnection on a display device provided on a portion of the keyboard input device. Of course, there can be other variations, modifications, and alternatives.

Merely as an example, the following scenario describes a method for periodical monitor of a user's behavior according to an embodiment of the present invention.

a. User A logs in to a computer system.
b. While User A continues using the computer system, the keyboard periodically scans for the current user's biometric profile. If there is a mismatch between the current user's profile and User A's original profile used to log in, the system prompts the current user to validate his/her identify.
c. The system tightens the tolerance every time the current user's identity profile fails to match User A's profile.
d. Once the tolerance reaches to a predetermined level, the keyboard informs the user that connection with the PC has been severed and that the username/password and its associated profile are no longer valid for the current session.

The above sequence of steps provides secure operation of a computer system using a biometrics keyboard according to an embodiment of the present invention. As shown, the method uses a combination of steps including authenticating and continuous verification of user identify using keyboard biometric information. Other alternatives can also be provided where steps are added, one or more steps are removed, or one or more steps are provided in a different sequence without departing from the scope of the claims herein. Additionally, although the above has been described in terms of a keyboard device, other devices can also be used. Further details of these other devices using the present method can be found throughout the present specification and more particularly below.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A method for secure operation of a computing system using a biometrics keyboard, the method comprising:
providing a database of user keyboard behavior biometric information;
authenticating a user to use the biometrics keyboard;
establishing a secure connection with the computing system; and
subsequent to establishing the secure connection, the biometrics keyboard performing steps of:
probing the computing system to determine if the secure connection with the computing system is compromised;
if the secure connection is compromised, disabling the secure connection with the computing system;
sampling user keyboard behavior biometric information;
determining if the sampled user keyboard behavior biometric information is within an allowable tolerance;

disabling the secure connection with the computing system, if the sampled user keyboard behavior biometric information exceeds the allowable tolerance; and displaying indications associated with the sampled user keyboard behavior biometric information on a display device provided on a portion of the biometrics keyboard;

wherein authenticating the user to use the biometrics keyboard comprises:

the biometrics keyboard performing the steps of:

prompting the user to enter a user ID and a user password;

deriving biometric behavioral information from the entered user ID and user password;

comparing the derived biometric behavioral information with the database to determine if the derived biometric behavioral information is within the allowable tolerance;

disabling an initial connection, that is different from the secure connection, with the computing system, if the derived biometric behavioral information exceeds the allowable tolerance;

displaying indications associated with the derived user keyboard behavior biometric information on the display device provided on the portion of the biometrics keyboard; and tightening the tolerance, if the derived biometric behavioral information is within the allowable tolerance.

2. The method of claim 1, wherein disabling the secure connection to the computing system further comprises:

disconnecting the biometrics keyboard from the computing system; and displaying indications associated with the disconnection on the display device provided on the portion of the biometrics keyboard.

3. The method of claim 1, further comprising incorporating the sampled user keyboard behavior biometric information to improve database accuracy.

4. The method of claim 1, wherein the display device is a matrix display device.

5. The method of claim 1, wherein the display device is capable of displaying at least 32 characters.

6. The method of claim 1, wherein the biometrics keyboard further comprises a wireless device which allows the biometrics keyboard to interface with the computing system.

7. A method in a keyboard having an initial connection with a computing system, comprising the keyboard performing steps of:

authenticating a user based on user keyboard behavior biometric information, comprising:

prompting the user to enter a user ID and user password;

deriving keyboard behavior biometric information from the entered user ID and user password;

comparing the derived keyboard behavior biometric information with a database of keyboard behavior biometric information to determine if the derived keyboard behavior biometric information is within an allowable tolerance;

disabling the initial connection with the computing system, if the derived keyboard behavior biometric information exceeds the allowable tolerance;

tightening the tolerance, if the derived keyboard behavior biometric information is within the allowable tolerance;

subsequent to authenticating the user, establishing a secure connection, that is different from the initial connection, with the computing system, if the derived keyboard behavior biometric information is within the allowable tolerance;

subsequent to establishing the secure connection, sampling user keyboard behavior biometric information;

determining if the sampled user keyboard behavior biometric information is within the allowable tolerance;

disabling the secure connection with the computing system, if the sampled user keyboard behavior biometric information exceeds the allowable tolerance; and displaying indications associated with the sampled user keyboard behavior biometric information on a display device provided on a portion of the keyboard.

8. The method of claim 7, wherein disabling the secure connection to the computing system further comprises:

disconnecting the keyboard from the computing system; and displaying indications associated with the disconnection on the display device provided on the portion of the keyboard.

* * * * *